United States Patent [19]

Orain

[11] Patent Number: 4,708,693

[45] Date of Patent: Nov. 24, 1987

[54] SLIDING HOMOKINETIC TRANSMISSION JOINT INTENDED FOR MOTOR VEHICLES

[75] Inventor: Michel A. Orain, Conflans Sainte Honorine, France

[73] Assignee: Glaenzer Spicer, Poissy, France

[21] Appl. No.: 873,402

[22] Filed: Jun. 12, 1986

[30] Foreign Application Priority Data

Jun. 14, 1985 [FR] France .................. 85 09084

[51] Int. Cl.[4] .................. F16D 3/20; F16C 31/04
[52] U.S. Cl. .................. 464/111; 464/167; 464/905
[58] Field of Search .................. 384/50, 51, 55, 59, 384/572, 575, 580; 464/111, 122, 123, 124, 167, 905

[56] References Cited

U.S. PATENT DOCUMENTS

| 2,435,839 | 2/1948 | McNicoll | 384/575 |
| 2,525,971 | 10/1950 | Stone | 384/59 |
| 4,192,154 | 3/1980 | Nakamura et al. | 464/111 |
| 4,524,671 | 6/1985 | Bender et al. | 384/51 X |

FOREIGN PATENT DOCUMENTS

| 1903600 | 9/1969 | Fed. Rep. of Germany . | |
| 1585469 | 1/1970 | France . | |
| 2506872 | 12/1982 | France . | |
| 2512140 | 3/1983 | France . | |
| 2525306 | 10/1983 | France . | |
| 2554532 | 5/1985 | France . | |
| 2554528 | 5/1985 | France . | |
| 59-40016 | 3/1984 | Japan | 464/111 |

Primary Examiner—Daniel P. Stodola
Attorney, Agent, or Firm—Wenderoth, Lind & Ponack

[57] ABSTRACT

A sliding transmission joint intended for motor vehicles, which includes a tripod (1) locked in rotation with a driving shaft (2) and provided with three radial arms (3) capable of sliding axially on flat rolling tracks (22) provided inside a drum (5). The drum 5 is locked in rotation with a driven shaft, rows of needle rollers (7) are arranged between the arms (3) and the rolling tracks (22), and also cages (14) are provided for holding the rows of needle rollers (7). The cages (14) having projecting members (16) which are used for attaching the cages (14) to the drum (5) and which are accommodated in corresponding recesses (15) formed in the drum. The arrangement of the projecting members 16 and recesses 15 ensures that the cage (14) is guided perfectly as far as the end of the extension of the driving shaft (2), and reduces the weight of the joint by eliminating projecting parts (28) between two internal adjacent shoulders of the rolling tracks.

24 Claims, 15 Drawing Figures

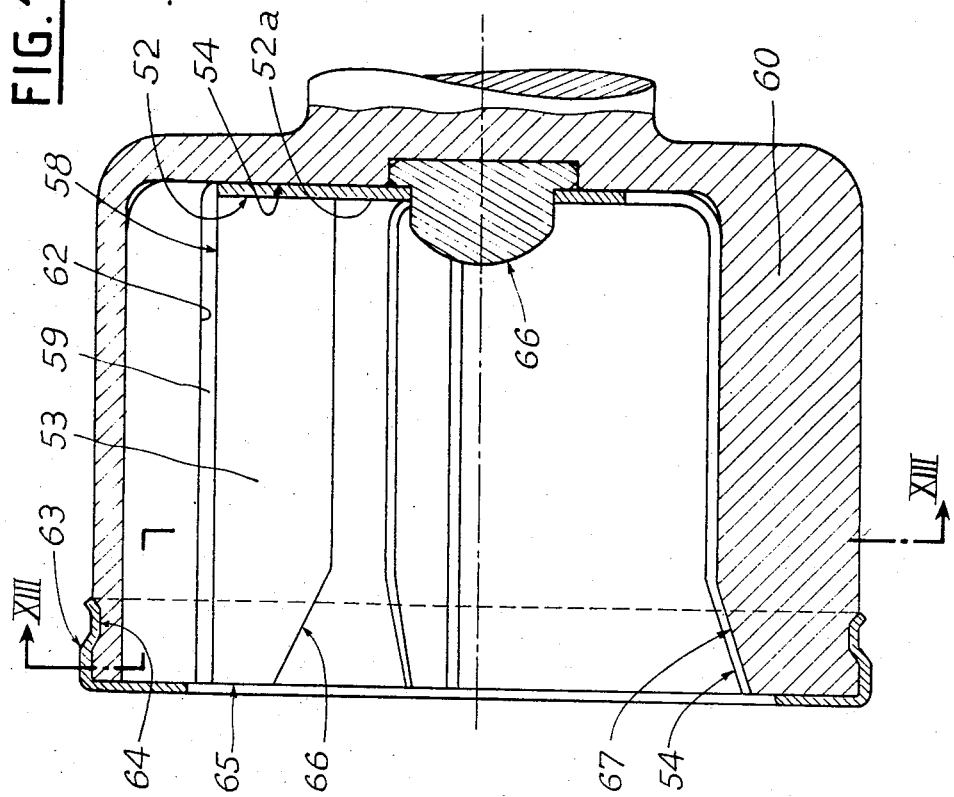

4,708,693

SLIDING HOMOKINETIC TRANSMISSION JOINT INTENDED FOR MOTOR VEHICLES

BACKGROUND OF THE INVENTION

1. Field of the Invention

The present invention relates to a sliding homokinetic transmission joint intended for motor vehicles.

2. Description of the Prior Art

More particularly, the invention concerns joints of the type comprising a tripod locked in rotation with a driving shaft and provided with three radial arms capable of sliding axially on flat rolling tracks provided inside a drum locked in rotation with a driven shaft, rows of needle rollers arranged between the arms of the tripod and the rolling tracks, and also cages for holding the rows of needle rollers. The cages are guided laterally by parallel shoulders defining the upper and lower edges of the rolling tracks, such that the cages remain exactly aligned parallel to the general axis of the rolling track, itself parallel to the axis of the drum. Consequently, the needles, which are held by the cage so that they are perpendicular to the longitudinal axis of the latter, always roll precisely in their natural direction, i.e. without sliding and without giving rise to lateral frictional forces. Such a joint is described in French Pat. No. 2,506,872.

So that there is sufficient angular clearance for the driving shaft, the internal guiding shoulder close to the edge of the drum must be eliminated, for which purpose a chamfer of large dimensions is machined in the latter. Consequently, at the end of the extension of the driving shaft, the cage is not guided properly and undesirable friction and frequent binding occur.

SUMMARY OF THE INVENTION

Therefore, the aim of the invention is to provide a joint of the abovementioned type, which is constructed such that the abovementioned drawbacks are overcome.

According to the invention, the cages have projecting means comprising guiding members which are arranged on only one side of the cage, i.e. the side situated towards the outside of the drum, and which are slidingly engaged with case retaining means, such as a single longitudinal groove machined in the drum along the external edge of the rolling track or the cage retaining means can comprise adjacent members mounted on the interior of the drum.

Due to the arrangement of such projecting means, an internal guiding shoulder for the cage formed by a projecting part along the entire length of the drum can be eliminated and the latter can thus be bored so as to have a larger diameter limited by the effective width of the rolling track corresponding to the length of the cylindrical part of of the needles.

It is thus still ensured that the cages are perfectly guided, independently of the chamfer at the open end of the drum which is required in order to obtain maximum sliding at an angle.

According to a first possible embodiment, the projecting means consist, in the case of each cage, of projecting guiding members provided at the ends or in the vicinity of the ends on one side of the cage.

BRIEF DESCRIPTION OF THE DRAWINGS

Other objects, features and advantages of the invention will become apparent from the following description taken in connection with the attached drawings which illustrate embodiments thereof by way of non-limiting examples, in which:

FIG. 2 is an axially sectioned view, in partial elevation, of the sliding joint shown in FIG. 1a;

FIG. 8 is a sectional view along the line VIII—VIII of FIG. 1a;

FIG. 13 is a half cross-sectional view, along the line XIII—XIII of FIG. 14 of a fifth embodiment of the joint according to the invention; and FIG. 14 is an axially sectioned view along the line XIV—XIV of FIG. 13.

DESCRIPTION OF THE PREFERRED EMBODIMENTS

Figure 1A:
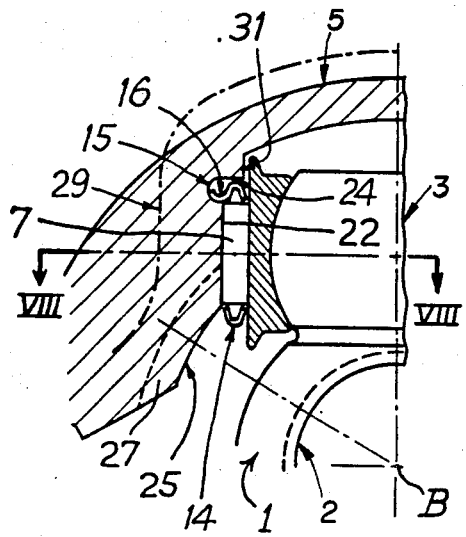
FIG. 1a is a cross-sectional view, in partial elevation, of a sliding homokinetic transmission joint of the present invention showing one embodiment of the cages and drum according to the present invention.
Figure 1B:
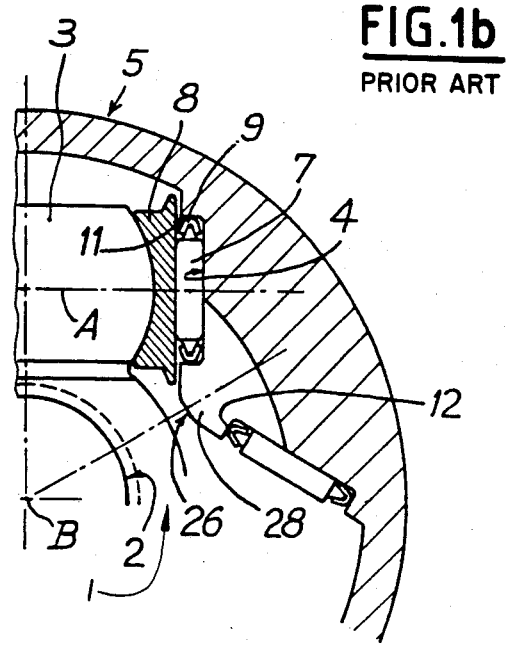
FIG. 1b is a cross-sectional view, in partial elevation, of a sliding homokinetic transmission joint according to the prior art.
Figure 2:
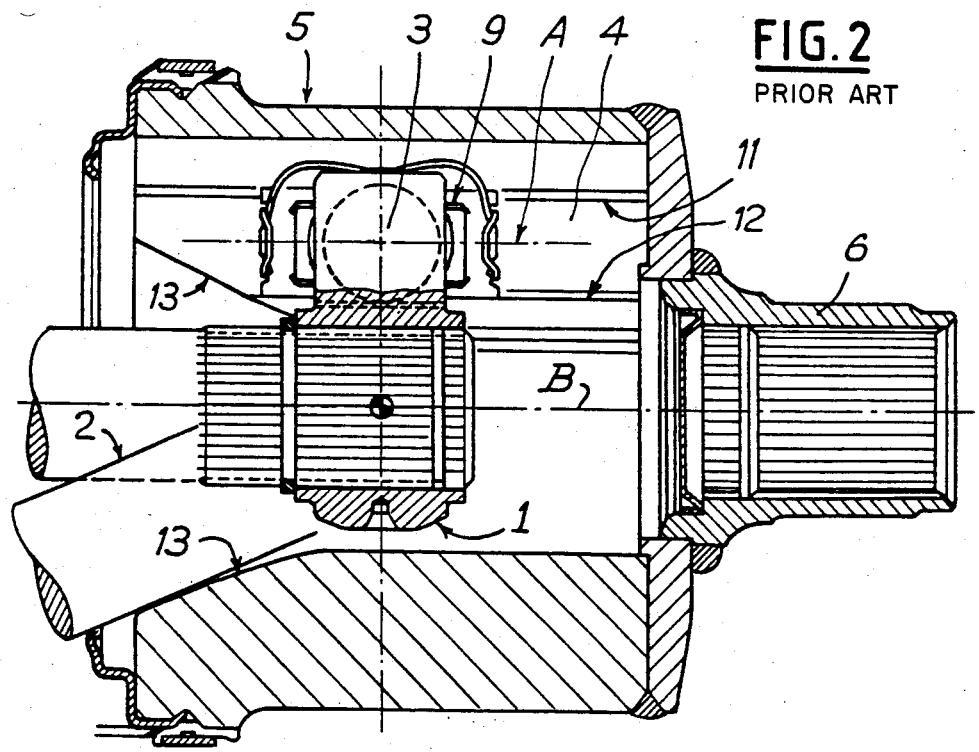

The prior art transmission joint shown in FIGS. 1b and 2 is intended for motor vehicles and comprises a tripod 1 locked in rotation with a driving shaft 2 and provided with three radial arms 3 capable of sliding axially on flat rolling tracks 4 provided inside a drum 5 locked in rotation with a driven shaft (not shown). Rows of needle rollers 7 and bearings or cup-shaped members 8 are arranged between the arms 3 and the rolling tracks 4, and cages 9 keep the rows of needles 7 on the tracks 4. The latter are each defined between two longitudinal shoulders 11, 12 arranged in such a way that the cages 9 remain exactly aligned parallel to the general axis A of the rolling track 4, itself parallel to the axis B of the drum 5. Consequently, the needles 7, which are held by the cage 9 so that they are perpendicular to the longitudinal axis A, always roll precisely in their natural direction, i.e. without sliding and without giving rise to lateral frictional forces. So that there is maximum angular clearance for the driving shaft 2, a chamfer 13 of large dimensions is machined in one end of drum 5.

According to the invention shown in FIG. 1a, cages 14 have projecting means extending towards the outermost surface of the drum and beyond a plane defined by the rolling track surface comprising guiding members 16 on the drum 5, which are accommodated by cage retaining means associated with the drum comprising corresponding longitudinal recesses or grooves 15 formed in the drum 5 for slidingly engaging each projecting means to allow the cages to move axially along the rolling tracks, these guiding members being formed solely on the side of the cage 14 situated towards the outside of the drum 5, i.e. the side of the cage located closest to the outermost surface of the drum.

In the embodiment shown in FIGS. 3 to 5 and 8, these projecting means or guiding members consist, in the case of each cage 14, of blade-like arcuate shaped guiding members or extensions 16 provided at the ends of an external longitudinal side piece 17 of the cage, this longitudinal side piece being connected to the opposite longitudinal side piece by crosspieces 18.

Figure 7:
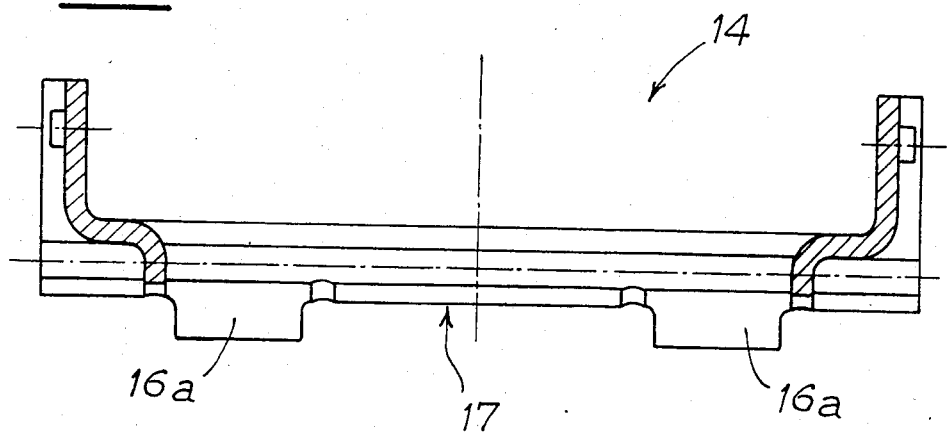
FIG. 7 is a view, similar to that shown in FIG. 4, of a variation of an embodiment of the cage according to the invention.

By way of a variation (FIG. 7), the blade-like arcuate shaped guiding members 16a are arranged in the vicinity of the ends of the longitudinal side piece 17.

Figure 3:
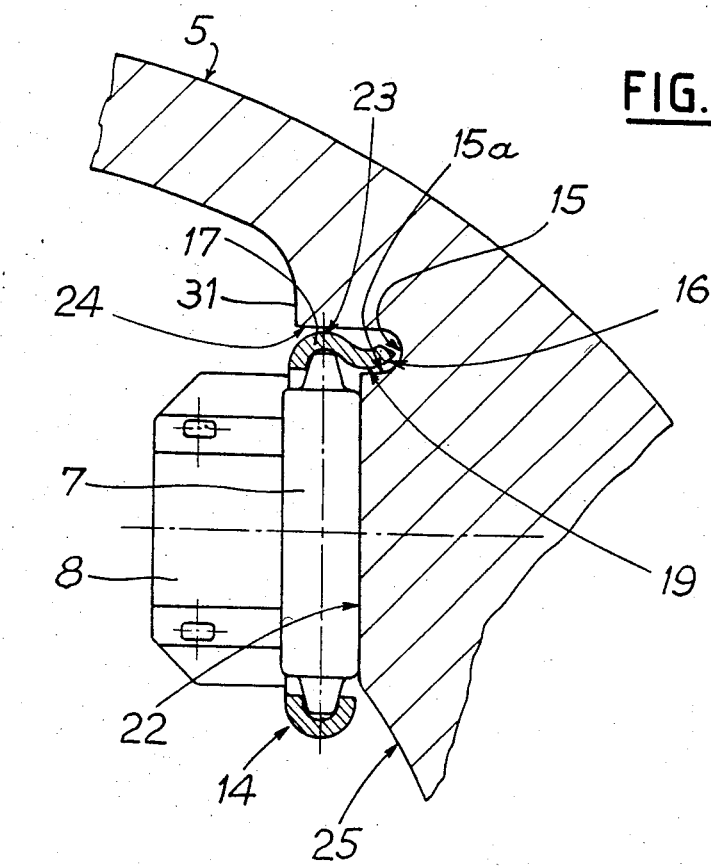
FIG. 3 is a partial view on an enlarged scale, along the line III—III of FIG. 5, of the needle-retaining cage and of the drum, corresponding to the FIG. 1a, according to a first embodiment.
Figure 4:
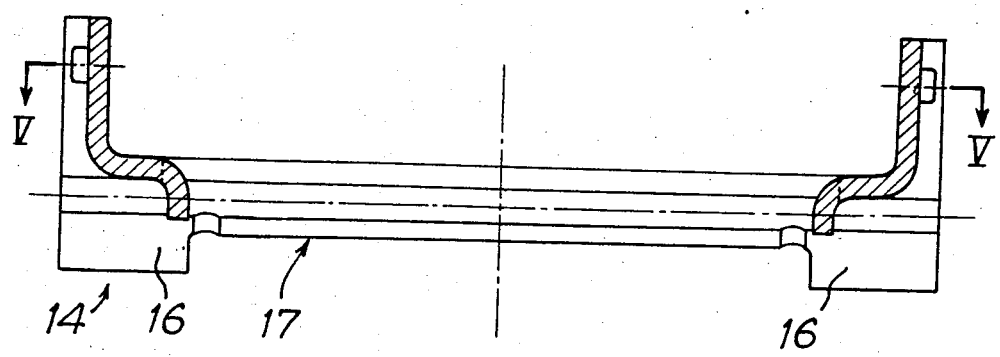
FIG. 4 is a sectional view, along the line IV—IV of FIG. 5, of the needle-retaining cage.
Figure 5:
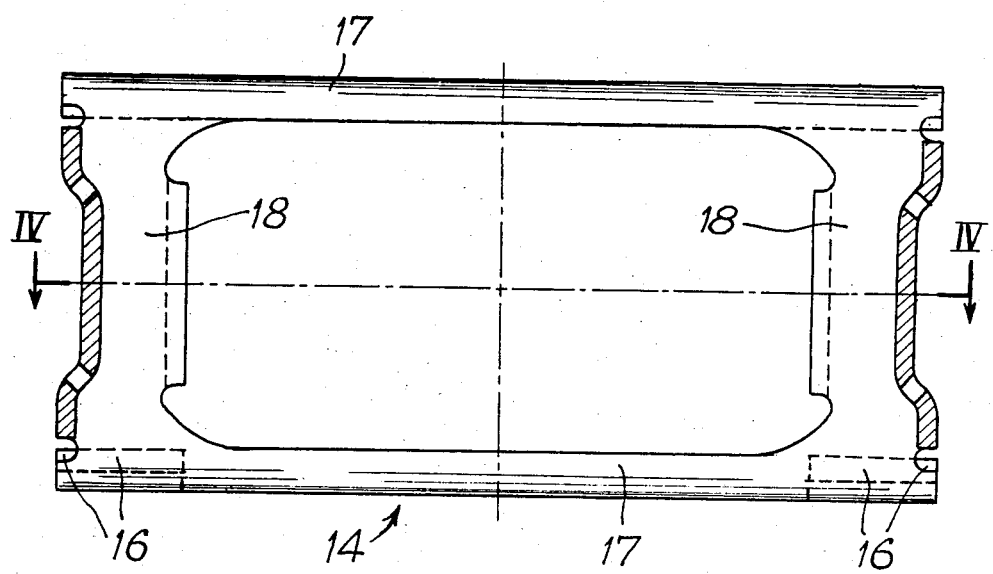
FIG. 5 is a view, in longitudinal elevation and in partial cross-section, along the line V—V of the cage shown in FIG. 4.

In the case of each cage 14, these projecting means or guiding members may also be formed as single parts and extend along the entire length of the cage. The above-mentioned blade-like arcuate shaped guiding members 16 or extensions of each cage 14 are curved inwards with a convex portion 23 facing away from the opposite side of the cage, for example in the form of a quarter or half bend, and rest by means of another convex portion 19 facing toward the opposite side of the cage against an internal side wall 15a of the recess 15, this internal side wall leading to a corresponding rolling track 22. In line with each blade-like arcuate shaped guiding member 16 or 16a, the corresponding longitudinal side piece 17 is connected to the blade-like member by means of the convex rear portion 23 sliding against a shoulder 24 defining, together with the internal side wall 15a, the recess 15 associated with the rolling track 22, the bottom of the recess 15 being preferably circular (FIG. 3).

Figure 8:
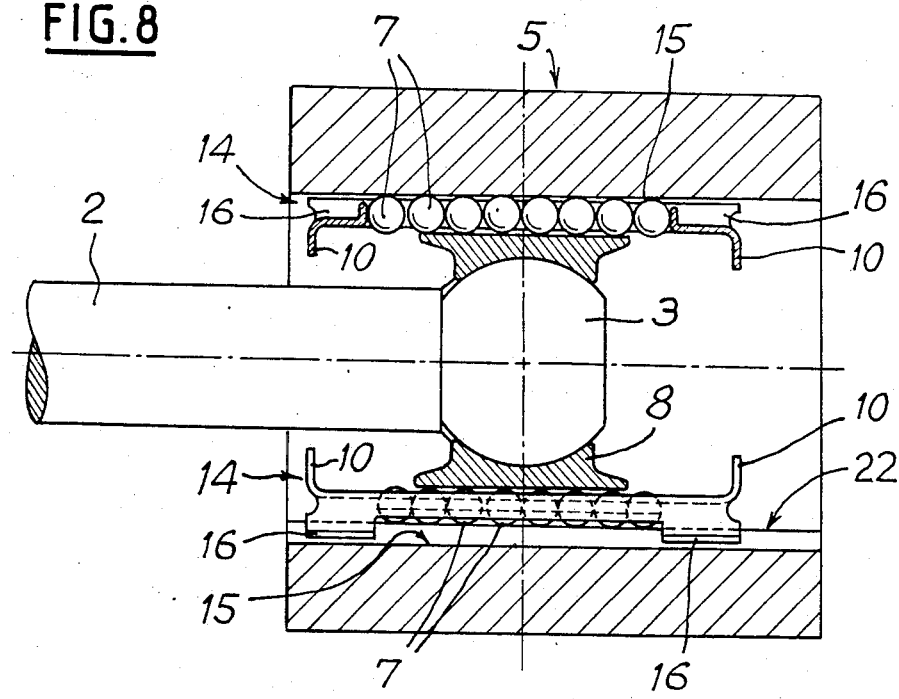

The cage 14 is provided, at its ends, with folded back transverse flanges 10 which serve as end-of-travel stops for the cage, by means of contact with the ends of the cup-shaped members 8 (FIG. 8).

With the internal shoulders 12 of the joint according to the prior art (FIG. 2) eliminated, the drum 5 of the joint according to the invention has a bore 25 (FIGS. 1a and 3), the diameter of which is clearly greater than that of the bore 26 (FIG. 1b) required in the prior art, the bore 25 being limited by the effective width of the rolling track 22 corresponding to the length of the cylindrical part of the needles 7. A chamfer 27 (FIG. 1a), provided at the end of the drum, obviously does not hinder in any way guiding of the needles 7. Due to the arrangement of the bore 25, the fragile projecting parts 28 located, in the prior art, between the internal shoulders 12 of two continguous rolling tracks (FIG. 1b) can be eliminated.

Figure 9:
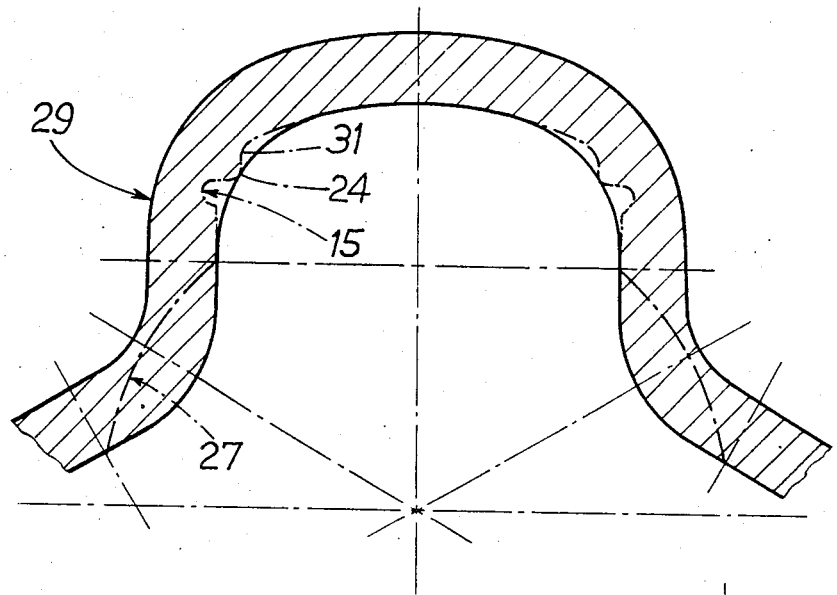
FIG. 9 is a cross-sectional view of a tube blank from which the cage according to the invention may be made.

The sliding homokinetic joint according to the invention has the following technical advantages:

(1) due to the arrangement of projecting means comprising the guiding members 16, 16a retaining the cages 14 and their needles 7, and also the cage retaining means comprising the longitudinal grooves or recesses 15 for these guiding members 16, 16a, perfect guiding of the cages 14 is ensured, independently of the chamfer required in order to obtain maximum sliding at an angle; this essential characteristic feature of the invention also makes it simpler and less costly to manufacture the homokinetic joint, while reducing its weight, in particular due to elimination of the fragile parts 28;

(2) due to the enlarged bore 25, forged blanks which are less complicated and lighter than those of joints according to the prior art can be used;

(3) high wear resistance surface hardening of the rolling tracks 22, which is generally performed after rapid heating by means of induction, no longer gives rise to problems of stress cracks, since the fragile part 28 is eliminated;

(4) finally, it is possible to obtain a simple blank which is very similar to the drum 5 and consists of a profiled tube 29 (shown in FIG. 9); machining thus consists in cutting the profiled parts 29 to the required length, broaching which defines at the same time the profiles of the rolling track 22, recess 15, shoulder 24 and a flat surface 31 adjacent to the edge of the shoulder 24, and turning of the inside chamfer 27 at the end of the drum 5.

Consequently, machining is simplified, using a simpler and sturdier broaching tool, surface-hardening of the rolling tracks 22 is made easier, and the weight of the material used is reduced, while perfect guiding of the cage 14 is ensured over the entire distance of extension.

Figure 10:
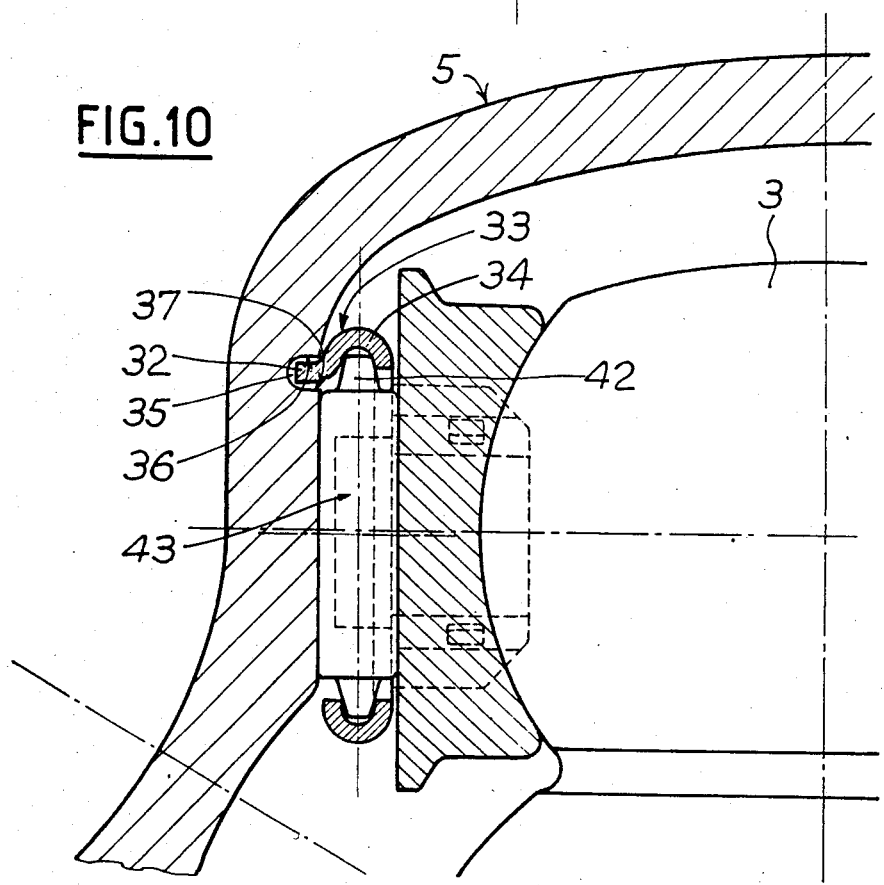
FIG. 10 is a view, similar to that shown in FIG. 3, of a third embodiment of the cage.

FIG. 10 shows a third embodiment of a variation of the present invention in which only end parts 32 of blade-like arcuate shaped guiding members 33 are engaged inside recesses formed in the drum 5 which consist of grooves 35, formed by side walls 36, 37 against which the said end parts 32 bear. The end parts 32 include convex rear portions 34 which face away from the opposite side of the cage and form an extension of the latter which is located outside the grooves 35. Thus, the convex rear portions 34 are no longer used for guiding the cage, this being ensured solely by the attaching ends 32 which allow movement both axially and in the direction of translation towards the inside and the outside of the drum 5, without the need for the shoulders 11 or 24 of the drum 5 (FIGS. 1a, 1b and 3).

Consequently, the shape of the drum is simplified and the latter can be provided with a profile having a practically constant thickness and hence can be manufactured at a low cost from pressed, rolled or folded sheet steel.

Figure 11:
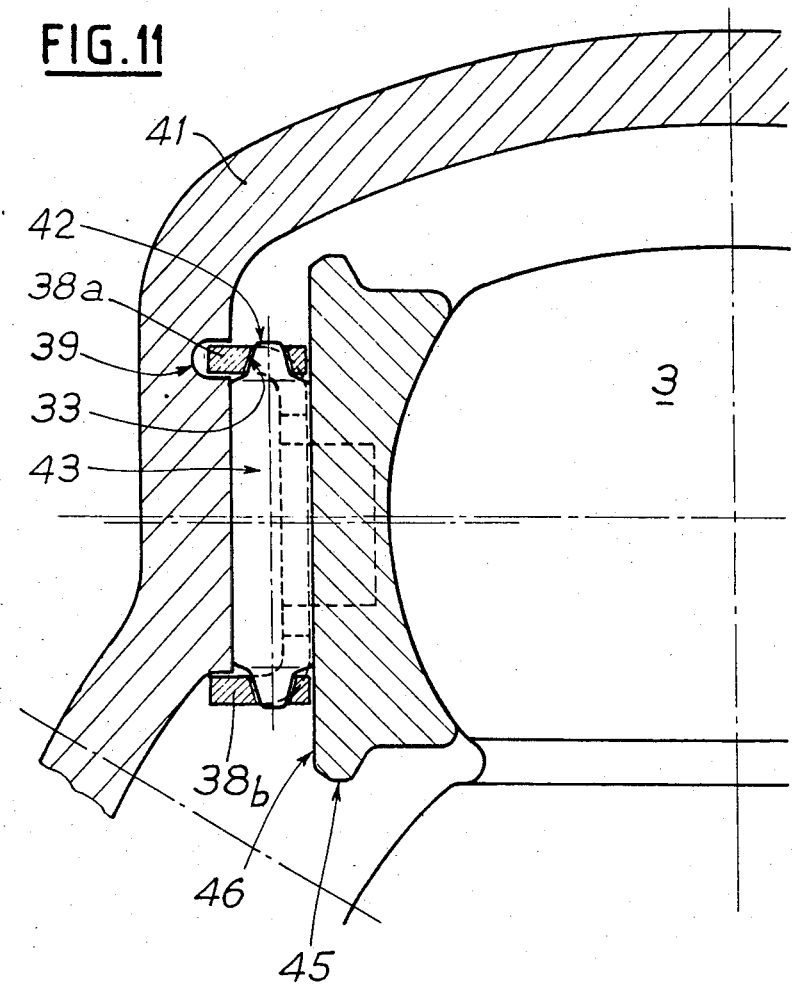
FIG. 11 is a view, similar to that shown in FIG. 3, of a fourth embodiment of the cage.
Figure 12:
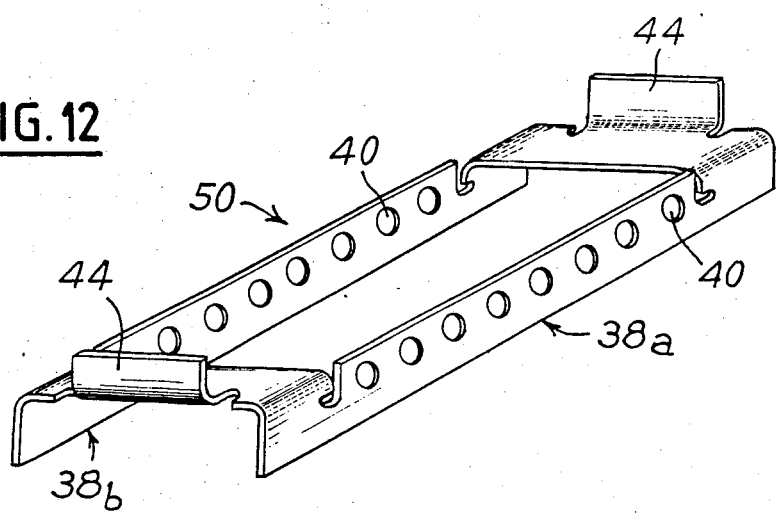
FIG. 12 is a perspective view of the cage shown in FIG. 11.

In the fourth embodiment shown in FIGS. 11 and 12, each cage 50 has side pieces 38a, 38b for attaching the cage to the drum 5, one of which 38a comprises the projecting means which penetrates inside a corresponding groove 39 which comprises the cage retaining means and which is machined or cold-formed in the inner wall 41 of the drum. The groove 39 ensures lateral and axial guiding of the cage 50, and the longitudinal side pieces 38a, 38b have conical holes 40 inside which the ends 42 of the needles 43 revolve. The cage 50 is provided, at its ends and between the side pieces 38a, 38b, with folded flanges 44 serving as stops for limiting the travel of the cage, by means of contact with opposite edges 45 of cup-shaped members 46 arranged between the needles 43 and the associated arm 3.

Penetration of the side pieces 38a into the groove 39 ensures perfect guiding of the cage 50 in the direction of lateral translation and in the axial direction. The side pieces 38a, 38b are made by means of folding after cutting up and boring of a sheet-steel blank, at the end of which operations the cage 50 shown in FIG. 12 is obtained.

The fifth embodiment is an example of embodiment of the invention, shown in FIGS. 13 and 14 in which the longitudinal grooves comprising the cage guiding means for guiding the cage are no longer machined in the drum, but rather the cage guiding means are formed by means of adjacent members mounted on the drum.

Thus the invention provides here for a star-shaped clip 52 with the members comprising six radial arms 53, the clip 52 being made preferably from hardened sheet steel and having a base 52a which bears against the bottom or inner axial end surface 54 of the drum 60. Each arm or member 53 bears against the drum 60 and has an internal surface 55 forming a rolling track for the needles 56 contained inside the cages 57, while the edges 58 of the arms or members 53 situated towards the outside of the drum 60 form one of the two side walls of guiding grooves 59 receiving the projecting means comprising guiding members 61 of the cages 57, the second outer side wall 62 of which is machined in the drum 60 and spaced from the edge 58 located closest to the outermost surface of the drum 60.

Thus, the single guiding groove or slide 59, located on the outer side of the rolling track 55, is mounted inside the drum 60.

Means are provided for fixing or securing the clip 52 axially to the drum 60. In the example described, these recovery means consist of a sheet-metal or plastic cap 63 which encloses the free edge of the drum 60 onto which it is crimped or snap-engaged at 64, and which performs a dual function. In fact, on the one hand, it prevents untimely disengagement of the movable members (not shown) made in a manner known per se, and, on other hand, it retains the clip 52 axially by means of contact with the free ends 65 of the six arms or members 53 of the latter. The base 53a of the clip 52 may be perforated so as to guide and hold an elastic stop 66 for determining the end of compressive travel of the shaft (not shown).

Figure 6:
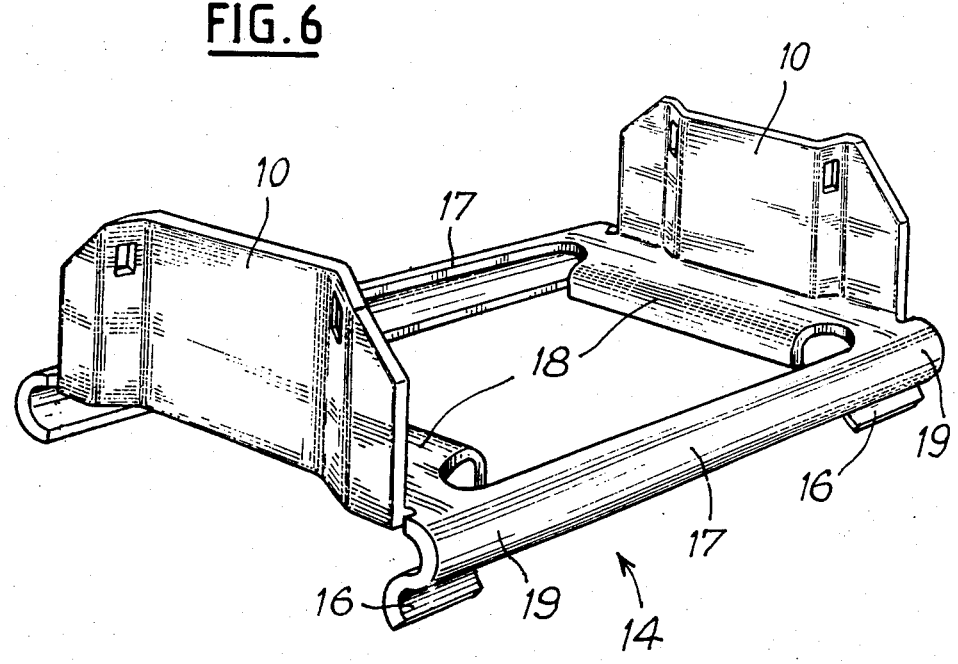
FIG. 6 is a perspective view, on an enlarged scale, of the cage shown in FIGS. 3 to 5.

The cage 57, the outer side wall 61 of which comprises the projecting means which is guided by the groove 59, is of the type where the needles 56 revolve individually inside the holes 40 formed in its two longitudinal side pieces (cage 50 in FIG. 12), but it may obviously be replaced by a cage of the type having blade-like members, such as the cage 14 (FIG. 6). The ends of the arms or members opposite the base 52a are cut in the shape of bevels 66 so as not to project beyond the cone formed by the chamfer 67 of the drum 60, itself provided so as to increase the sliding length and angle of the joint.

Despite the chamfer 67, when the joint is in the fully extended position, the needle cages 57 or 14 are positively guided by the cage retaining means comprising the slides or grooves 59 located on the radially outermost side of the rolling track 55, this single groove or guide for each cage 57, 14 extending as far as the edge of the drum 5, 60.

While the invention has been fully described by way of example with reference to the accompanying drawings, it should be understood that various changes and modifications will be apparent to those skilled in the art. Therefore, unless otherwise such changes and modifications depart from the scope of the present invention, they should be constructed as being included therein.

I claim:

1. Sliding transmission joint intended for motor vehicles, comprising a tripod (1) locked in rotation with a driving shaft (2) and provided with three radial arms (3) capable of sliding axially on flat rolling tracks (22) provided inside a drum (5) locked in rotation with a driven shaft, rows of needle rollers (7) arranged between the arms (3) of the tripod (1) and the rolling tracks (22), and also cages (14) for holding the rows of needles (7), characterized in that the cages (14) have projecting guiding members (16) which are arranged on the side of each cage (14) which is located closest to the outermost surface of the drum (5), and each of which slide inside a single longitudinal groove (15) machined in the outer edge of the rolling track (22).

2. Joint according to claim 1, characterized in that the projecting guiding members consist, in the case of each cage, of blade-like members (16) provided at the ends or in the vicinity (16a) of the ends of one side of the cage (14).

3. Joint according to claim 2, characterized in that only end parts (32) of the blade-like members (33) are engaged in grooves (35) formed in the drum (5) and the end parts (32) bear against the side walls (36, 37) of the grooves (35), the end parts (32) being connected to the side of the cage by portions (34) which are located outside the grooves (35).

4. Joint according to claim 1, characterized in that the projecting guiding members consist, in the case of each cage, of an extension extending along the entire length of the cage (14).

5. Joint according to claim 4, characterized in that the blade-like members (16, 16a) of each cage (14) are curved inwards to form convex portions (19) which bear against internal side walls (15a) of the grooves (15).

6. Joint according to claim 5, characterized in that each cage (14) comprises a longitudinal side piece which is connected to the blade-like members (16, 16a) and which has an additional convex portion (23) which slides against a shoulder (24) of the associated rolling track (22).

7. Joint according to claim 1, characterized in that each cage (50) has side pieces (38a, 38b) for attaching the cage to the drum (5), one of which (38a) penetrates inside a corresponding groove (39) which is machined in the wall (41) of the drum and ensures axial lateral guiding of the cage (50), the side pieces (38a, 38b) have holes (40) arranged so as to receive the ends (42) of the needles (43) and the cage (50) is provided with folded back flanges (44) serving as stops for limiting the travel of the cage by means of contact with edges (45) of cup-shaped members (46) arranged between the needles (43) and the associated arm (3).

8. Sliding transmission joint intended for motor vehicles, comprising a tripod (1) locked in rotation with a driving shaft (2) and provided with three radial arms (3) capable of sliding axially on flat rolling tracks (55) provided inside a drum (60) locked in rotation with a driven shaft, rows of needle rollers (56) arranged between the arms (3) of the tripod (1) and the rolling tracks (55), and also cages (57) for holding the rows of needles (56), characterized in that the cages (57) have projecting guiding members (61) which are arranged on the side of each cage (57) which is located closest to the outermost surface of the drum (60), and each of which slide inside a single longitudinal groove (59) formed by mounted adjacent members (52, 53) disposed in the drum (60).

9. Joint according to claim 8, characterized in that the mounted adjacent members comprise a star-shaped clip (52) having six radial arms (53) and a base (52a) which bears against the bottom (54) of the drum (60), each arm (53) bearing against the drum and having a surface (55)

forming a rolling track for the needles (56) contained inside the cages (57), while the edge (58) of each arm (53) situated towards the outside of the drum forms one of the two side walls of a guiding groove (59) receiving the guiding members (61) of the cage, the second side wall (62) of which is machined in the drum (60).

10. Joint according to claim 9, characterized in that means are provided for fixing the clip (52) axially to the drum (60) comprising a cap (63) crimped or snap-engaged onto the free edge of the drum (60) and bearing against the ends of the arms (53) of the clip (52), which ends are cut in the shape of bevels (66) so as not to project beyond the cone formed by a chamfer (67) provided inside the drum (60) so as to increase the sliding length and angle of the joint.

11. A sliding transmission joint intended for motor vehicles, comprising:
a tripod adapted for rotation with a driving shaft, said tripod including three radially extending arms;
a drum adapted for rotation with a driven shaft, said drum including flat rolling tracks therein for axial sliding of said arms therealong, each of said rolling tracks extending in an axial direction and defining a rolling track surface accomodating a respective one of said arms;
rows of needle rollers, each of said rows being disposed between a respective one of said arms and a corresponding one of said rolling tracks;
cages for holding said rows of needle rollers, each of said cages being disposed between a respective one of said arms and a corresponding one of said rolling tracks, each of said cages having projecting means disposed thereon on a side thereof located closest to the outermost surface of said drum, said projecting means extending towards the outermost surface of said drum and beyond a plane defined by the rolling track surface of the corresponding one of said rolling tracks; and
cage retaining means associated with said drum for slidingly engaging each said projection means to allow said cages to move axially along said rolling tracks.

12. The sliding transmission joint of claim 11, wherein said projection means comprises arcuate shaped guiding members each of which is provided at an opposite end of one side of said cages.

13. The sliding transmission joint of claim 12, wherein each of said arcuate shaped members includes a convex portion facing toward an opposite side of said cages and said convex portion slidingly engages said cage retaining means.

14. The sliding transmission joint of claim 13, wherein each of said arcuate shaped members includes another convex portion facing away from said opposite side of said cages and said convex portion slidingly engages said cage retaining means.

15. The sliding transmission joint of claim 11, wherein said projection means comprises an extension which extends along the entire length of one side of said cages.

16. The sliding transmission joint of claim 15, wherein said extension includes a convex portion facing toward an opposite side of said cages and said convex portion slidingly engages said cage retaining means.

17. The sliding transmission joint of claim 16, wherein said extension includes another convex portion facing away from said opposite side of said cages and said convex portion slidingly engages said cage retaining means.

18. The sliding transmission joint of claim 11, wherein said cage retaining means comprises longitudinal grooves formed in said drum, each of said grooves slidingly engaging said projecting means disposed on a respective one of said cages.

19. The sliding transmission joint of claim 11, wherein said cage retaining means comprises members mounted on the inner surface of said drum, each of said members forming a respective one of said flat rolling tracks and having one longitudinal edge extending along said respective one of said flat rolling tracks for slidingly engaging a respective projecting means disposed on a respective one of said cages.

20. The sliding transmission joint of claim 19, wherein said drum includes sidewalls disposed along the inner surface thereof, each of said sidewalls being spaced from said longitudinal edge of a respective one of said members for receiving a respective projecting means therebetween.

21. The sliding transmission joint of claim 19, wherein said members comprise six axially extending members and each of said members are connected together at one end thereof by a base which bears against an inner axial end surface of said drum, each of said members having an opposite free end terminating along an open end of said drum, said free end of each of said members being secured to said drum by securing means extending therebetween.

22. The sliding transmission joint of claim 11, wherein said cage retaining means comprises members mounted on the inner surface of said drum, each of said members forming a respective one of said flat rolling tracks and having first and second longitudinal edges extending along said respective one of said flat rolling tracks and said cages further include projecting means disposed on a side thereof located furthest from the outermost side of said drum whereby said first and second longitudinal edges each slidingly engage a respective projecting means disposed on each side of a corresponding one of said cages.

23. The sliding transmission of claim 22, wherein said drum includes sidewalls disposed along the inner surface thereof, each of said sidewalls being spaced from the one of said longitudinal edges of a respective one of said members which is located closest to the outermost surface of said drum for receiving a respective projecting means therebetween.

24. The sliding transmission joint of claim 11, wherein each of said cages comprises spaced apart side pieces with one of said side pieces forming said projecting means, said cage retaining means comprising longitudinal grooves formed in said drum with each of said grooves receiving a respective projecting means formed by said one of said side pieces of said cages, and side pieces having holes therethrough for receiving ends of said needle rollers which extend between said side pieces, said cages including spaced apart cross pieces extending between said side pieces, said cross pieces each having respective flanges extending away from the inner surface of said drum and a cup-shaped member being provided between each row of said needle rollers and a respective arm with said cup-shaped member being disposed between said extensions to limit travel of a corresponding one of said cages.

* * * * *